United States Patent [19]
Matsuda et al.

[11] Patent Number: 4,662,469
[45] Date of Patent: May 5, 1987

[54] REAR WHEEL STEERING DEVICE FOR MOTORCYCLES

[75] Inventors: Atsushi Matsuda, Iwata; Toshiyuki Sato, Fukuroi, both of Japan

[73] Assignee: Yamaha Hatsudoki Kabushiki Kaisha, Iwata, Japan

[21] Appl. No.: 834,210

[22] Filed: Feb. 27, 1986

[30] Foreign Application Priority Data

Mar. 4, 1985 [JP]   Japan ................................. 60-42330

[51] Int. Cl.4 ............................................ B62K 21/00
[52] U.S. Cl. ................................... 180/219; 180/226; 180/227
[58] Field of Search .............. 180/219, 220, 222, 223, 180/224, 226, 227, 140, 233, 254; 280/91

[56] References Cited

U.S. PATENT DOCUMENTS 4,146,103  3/1979  Walter ................................. 180/140
4,157,739  6/1979  Frye ..................................... 180/224

*Primary Examiner*—John A. Pekar
*Attorney, Agent, or Firm*—Harness, Dickey & Pierce

[57] ABSTRACT

An embodiment of steering arrangement for motorcycles wherein the rear wheel is supported for steering movement and is mechanically coupled to the mechanism for steering the front wheel so that both wheels will be steered in unison. The rear wheel is driven by means of a shaft drive.

9 Claims, 5 Drawing Figures

REAR WHEEL STEERING DEVICE FOR MOTORCYCLES

BACKGROUND OF THE INVENTION

This invention relates to a rear wheel steering device for motorcycles and more particularly to an improved and simplified arrangement for steering both the front and rear wheels of a vehicle such as a motorcycle.

Most vehicles intended for use on public roads for transportation are designed so that they include one or more steered front wheels and one or more non-steered rear wheels. Motorcycles are typical examples of this type of vehicle wherein there is a steered front wheel and a non-steered driven rear wheel. Although such an arrangement offers the advantage of simplicity, it does not necessarily offer the best handling when rounding curves or changing directions. That is, when turning, the front wheel is steered into the direction of the turn but the rear wheel is still pointed in a direction tending to go straight ahead. This can cause difficulties in handling.

It is, therefore, a principal object of this invention to provide an improved steering arrangement for vehicles wherein both the front and rear wheels are steered.

It is a further object of this invention to provide a steering mechanism for vehicles that will improve their handling.

It is desirable to insure that the steering relationship between the front and rear wheels is positively controlled. Therefore, it is most desirable to provide a linkage system for interconnecting the front and rear wheel steering mechanisms. Such a linkage system should, however, be capable of accommodating the suspension movement of the rear wheel. In addition, it is normal practice to drive the rear wheel and the mechanism for driving the rear wheel should not interfere with the steering interconnection.

It is, therefore, a further object of this invention to provide an improved mechanism for both driving and steering the rear wheel of a vehicle.

It is another object of this invention to provide an arrangement for mechanically coupling the front and rear wheel steering of a vehicle and for driving the rear wheel without interfering with this coupling.

SUMMARY OF THE INVENTION

This invention is adapted to be embodied in a vehicle having at least one dirigible front wheel steered by an operator and at least one rear wheel. Means are provided for driving the rear wheel including a drive shaft. Means also support the rear wheel for steering movement and means mechanically couple the front wheel to the rear wheel for simultaneous steering movement.

DETAILED DESCRIPTION OF THE PREFERRED EMBODIMENT

Figure 1:
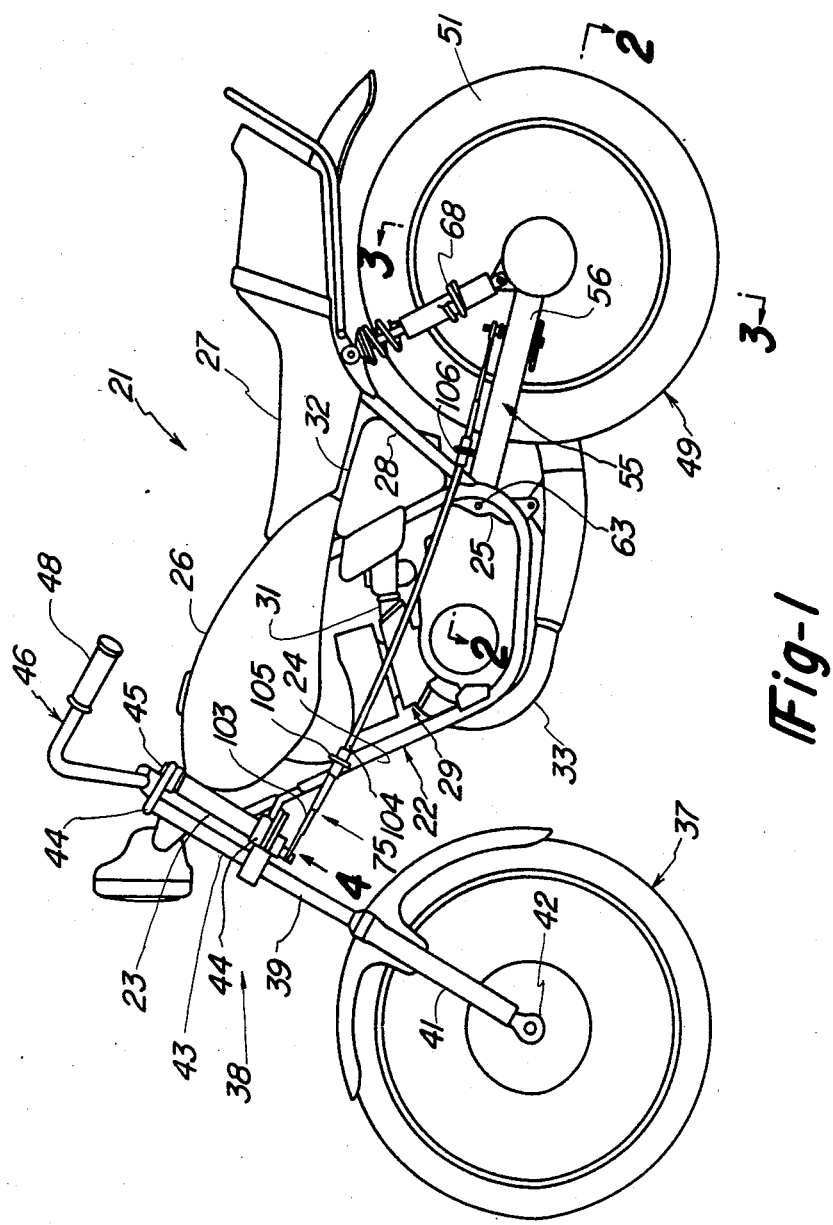
FIG. 1 is a side elevational view of a motorcycle constructed in accordance with an embodiment of the invention.

A motorcycle constructed in accordance with an embodiment of the invention is identified generally by the reference numeral 21. The motorcycle 21 includes a frame assembly, indicated generally by the reference numeral 22, and which may be of any known type. In the illustrated embodiment, the frame assembly 22 is depicted as being made up of a welded tubular construction including a head pipe 23, a main tube 20, a down tube 24 and brackets 25 that are affixed to the down tube and a rearwardly and downwardly projecting portion of the main tube. A fuel tank 26 is supported on the main tube and is positioned forwardly of a seat 27 that is supported on a seat rail and a seat pillar rail 28 of the frame assembly 22. Since the frame assembly per se forms no part of the invention, a further description of it is believed to be unnecessary.

An internal combustion engine, indicated generally by the reference numeral 29, is supported within the frame assembly 22 in a known manner. In the illustrated embodiment, the engine 29 is depicted as being of the reciprocating type and has one or more cylinders that receive a fuel/air charge from a carburetor 31 that is positioned rearwardly of the cylinder block and which extends in a generally horizontal direction. An air cleaner and air silencer assembly 32, which is positioned within the frame 22 rearwardly of the carburetor 31 and beneath the seat 27, supplies air to the carburetor 31. In addition, the engine 29 is provided with an exhaust system 33 for silencing the exhaust gases and discharging them to the atmosphere. The engine 29 also includes a combined crankcase, transmission assembly that drives an output shaft 34 (FIG. 2) at any of a plurality of selected speed ratios.

A front wheel 37 is supported from the forward portion of the frame assembly 22 and specifically the head pipe 23 for steering and suspension movement by means of a front wheel steering assembly, indicated generally by the reference numeral 38. The front wheel steering assembly 38 includes a front fork 39 having a tubular suspension system 41 that carries the front wheel 37 for rotation about an axis 42 at its lower end. The system 41 is supported for vertical movement relative to an upper portion 43 so as to accommodate controlled suspension movement for the front wheel 37.

Upper and lower brackets 44 connect the front fork upper portion 39 to a steering shaft 45 that is journaled for rotation about a front steering axis in the head pipe 23. A handlebar assembly 46 is connected to the brackets 44 and steering shaft 45. The handlebar 46 carries hand grips 48 at its outer end. It should be readily apparent that a rider positioned on the seat 27 may steer the front wheel 37 through the hand grips 48 and handlebar 46.

A driven rear wheel assembly, indicated generally by the reference numeral 49, is carried at the rear end of the frame assembly 22 in a manner to be described. The rear wheel 49 includes a tire 51 that is mounted on a rim 52 that is carried by spokes 53 and connected to a hub portion 54.

It should be noted that the motorcycle 21 as thus far described is generally conventional in configuration and, for that reason, only the general construction has been described in detail.

Figure 2:
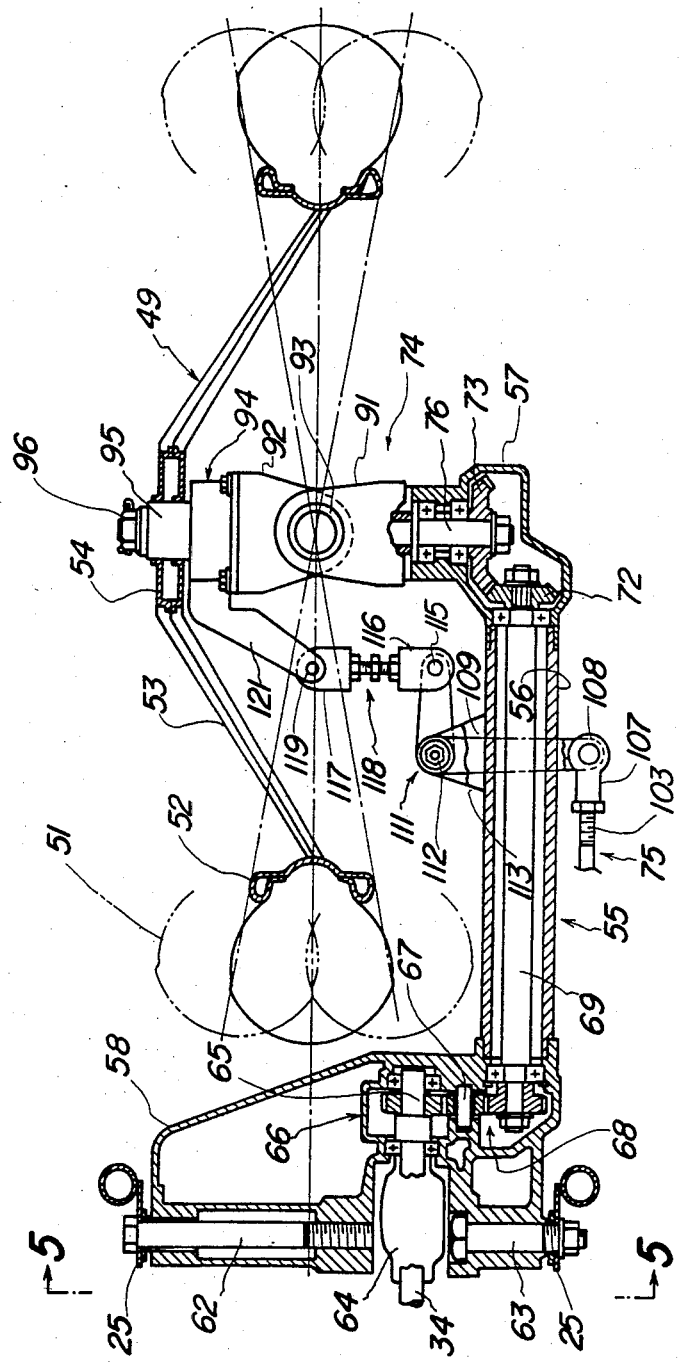
FIG. 2 is an enlarged cross-sectional view taken generally along the line 2—2 of FIG. 1.

The rear wheel 49 is supported for suspension movement relative to the frame 22 by means that include a trailing arm assembly, indicated generally by the reference numeral 55 and shown in most detail in FIG. 2. Because of differences which will be described, the trailing arm assembly 53 includes one rearwardly extending tubular arm portion 56 that lies on only one side of the rear wheel assembly 49 and which supports the rear wheel assembly by means of a hub carrier and final drive housing 57 that is fixed at its trailing end in a manner to be described. Forwardly of the rearwardly extending portion 56, the trailing arm 55 has a main portion 58 that extends substantially across the width of the motorcycle between the brackets 25 and which is generally hollow. This portion 58 is joiurnaled by a pair of axial spaced shafts 62 and 63 carried in the brackets 25.

The suspension travel of the rear wheel 49 and trailing arm 55 are controlled by a combined coil spring and shock absorber unit 68 that is loaded between the rear end of the arm portion 56 and the frame 22 at a point contiguous to where the seat pillar 28 joins the seat rail.

The rear wheel 49 is driven by means of a shaft drive assembly that may be best understood by reference to FIG. 2. To this end, a flexible joint 64 is connected, as by means of bonding, to one end of the engine output shaft 34. The other end of the flexible coupling 64 is affixed, as by bonding, to a stub shaft 65 that is journaled for rotation within a gear casing 66 formed in the hollow interior of the trailing arm portion 58. It should be noted that the flexible coupling 64 lies within the axis defined by the pivot shafts 62 and 63 so as to accommodate the suspension movement of the rear wheel assembly 49. It is to be understood that a universal joint could serve the same purpose.

The stub shaft 65 carries a spur gear which is in mesh with a spur gear that is journaled on an intermediate shaft 67 that is also contained within the gear casing 66. This gear, in turn, meshes with a further driving gear 68 that is affixed to one end of a drive shaft 69 that is journaled within the hollow interior of the trailing arm tubular portion 56 by means of a pair of axial spaced bearings 71. It should be noted that the shafts 65, 67 and 69 all extend parallel to each other and parallel to the longitudinal axis of the motorcycle.

The rear end of the drive shaft 69 carries a pinion gear 72 that is contained within the hub carrier and final drive housing 57. The pinion gear 72, in turn, meshes with a ring gear 73 which is also contained within this housing and which drives the rear wheel 49 in a manner which will be described.

Figure 3:
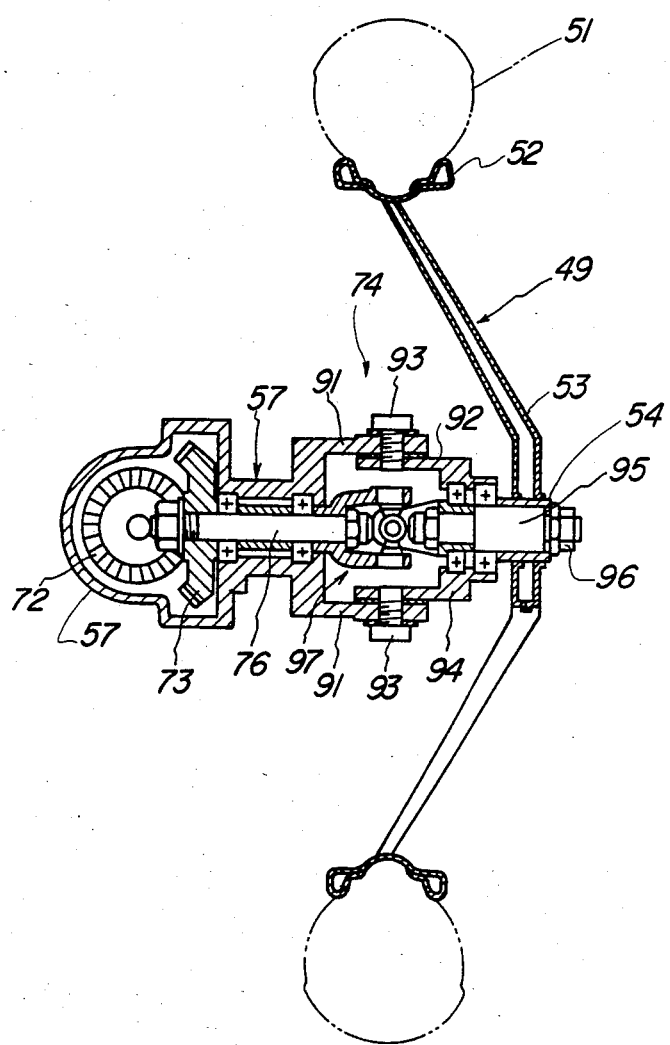
FIG. 3 is an enlarged cross-sectional view taken generally along the line 3—3 of FIG. 1.

In addition to being driven and supported for suspension movement, the rear wheel assembly 49 is also supported for steering movement by means of a steering support, indicated generally by the reference numeral 74 and shown in most detail in FIGS. 2 and 3. The steering support 74 is designed so as to provide a steering axis that passes through the transverse center of the rear wheel assembly 49 and which lies on a plane passing through the center of the motorocycle 21 and containing the front wheel steering axis. The rear wheel steering axis extends vertically.

The steering of the rear wheel 49 about its steering axis is controlled by means of a steering control mechanism, indicated generally by the reference numeral 75 which connects the front wheel steering mechanism with the rear wheel support mechanism 74 in a manner to be described.

Referring now primarily to FIGS. 2 and 3, the rear wheel steering support mechanism 74 will be described in detail. The hub carrier and final drive housing 57 has a pair of spaced apart bearings that rotatably journal a shaft 76. The shaft 76 is, in turn, affixed to the ring gear 73 in any known manner.

The hub carrier 57 has affixed to it a bifurcated member 91 which, in turn, is pivotally connected to a second bifurcated member 92 by means of a pair of vertically disposed pivot pins 93. The pivot axis between the bifurcated members 91 and 92 defined by the pivot pins 93 lies on the steering axis of the rear wheel assembly 49 and also within the motorcycle center plane.

The further bifurcated member 92 is affixed to a second hub carrier 94 which, in turn, journals a shaft 95 by means of a pair of spaced bearings. The shaft 95 is nonrotatably affixed to the rear wheel hub 54 by a splined connection and the hub 54 is held axially onto the shaft 95 by means of a retainer nut 96.

The shafts 76 and 95 are rotatably coupled by means of a universal joint 97 that has its respectively members affixed to the shafts 76 and 95 in a known manner. The universal joint 97 has its pivotal axis lying within the motorcycle center plane on the steering axis of the rear wheel axis so that the steering movement of the rear wheel assembly 49 will not interfere with the driving forces transmitted to the rear wheel through the universal joint 97. The unversal joint 97 and the rear wheel steering axis pass through the center of the rear wheel assembly 49 and specifically its rim 52 and the tire 51.

Figure 4:
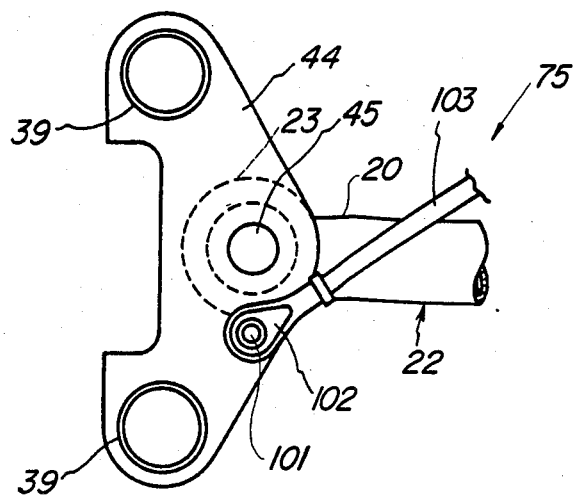
FIG. 4 is an enlarged view looking generally in the direction of arrow 4 in FIG. 1 and shows the mechanism for coupling the front wheel steering to the rear wheel steering.
Figure 5:
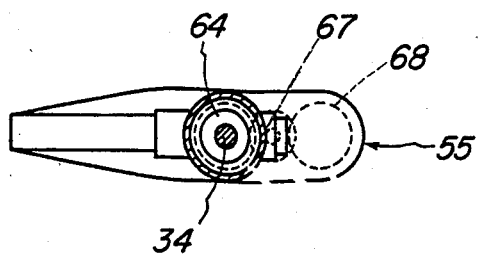
FIG. 5 is a cross-sectional view taken along the line 5—5 of FIG. 2.

The steering control mechanism 75 is provided for mechanically coupling the front wheel steering mechanism to the mechanism for steering the rear wheel 74 so that both wheels will be steered in unison. This mechanism includes a pin 101 (FIG. 4) that is affixed to the lowermost fork bracket 44 at a point offset from the front steering axis. A trunion member 102 connects the pin 101 to one end of a flexible transmitter 103 that is contained within a protective sheath 104. The adjacent forward end of the protective sheath 104 is carried by the down tube 24 and specifically by means of a bracket 105 that is connected to it.

The rear end of the protective sheath 104 is fixed adjustably to a bracket 106 carried by the trailing arm assembly 55. The rear end of the wire actuator 103 is connected by means of a trunion 107 and pivot pin 108 to one arm 109 of a bellcrank assembly 111 (FIG. 2). The bellcrank assembly 111 is supported for pivotal movement about a vertically extending axis by means of a pivot pin 112 that is carried by a bracket 113 that is affixed to the trailing arm portion 56. Another arm 114 of the bellcrank 111 is connected by means of a pivot pin 115 to a trunion 116. The trunion 116 is connected to a further trunion 117 by means of a turnbuckle assembly 118 so as to permit adjustment between the trunions 116 and 117. The trunion 117 is, in turn, connected by means of a pivot pin 119 to a steering arm 121 that is formed integrally with or affixed to the hub carrier 94.

The steering operation will now be described. If the rider steers the front wheel 37 by rotating the handlebars 46 and front wheel 37 about the steering axis as viewed in FIG. 4, there will be a force exerted on the flexible transmitter 103 to move it. This movement places a force on the bellcrank 111 and specifically its arm 109 so as to pivot it about the pivot pin 112. The arm 115 then exerts a force through the turnbuckle 118 so as to pivot the steering arm 112 and hub carrier 94 about the rear steering axis. Both the front and rear wheels will be steered in the same direction. The mechanical arrangement of the linkage system is such, however, that the angle of steering movement of the rear wheel 49 will be less than the angle of steering movement of the front wheel 37, for example, about 20% of the front wheel steering.

Because of the use of the flexible transmitter for transmitting the steering motion from the front to rear wheel, the suspension movement of the rear wheel 49 is easily accommodated and there will be no feedback or steering of the rear wheel 49 merely due to the suspension movement per se.

In view of the foregoing, it is believed to be readily apparent to those skilled in the art that a relatively simple and yet highly effective mechanism has been disclosed for permitting steering of the rear wheel mechanically in response to steering of the front wheel without interference from the rear wheel drive mechanism. Although an embodiment of the invention has been illustrated and described, various changes and modifications may be made without departing from the spirit and scope of the invention, as defined by the appended claims.

We claim:

1. A motorcycle having one dirigible front wheel steered by an operator and one rear wheel, the improvement comprising said wheels being suspended for suspension movement, an engine spaced from said wheels, means including a shaft drive for driving said rear wheel from said engine, means for supporting said rear wheel for steering movement, and means for mechanically coupling said front and said rear wheels for simultaneous steering movement.

2. A motorcycle as set forth in claim 1 further including operator control means for steering the front wheel.

3. A motorcycle as set forth in claim 2 wherein the means for mechanically coupling the front and rear wheel couples the rear wheel steering mechanism to the front wheel steering mechanism.

4. A motorcycle as set forth in claim 3 wherein the coupling means comprises a linkage system.

5. A motorcycle as set forth in claim 4 wherein the linkage system comprises a first lever affixed to a fork of the front wheel, a flexible transmitter having a first end thereof connected to said first lever at a point offset from the steering axis of the front wheel, a bellcrank supported for pivotal movement relative to the rear wheel, the other end of said flexible transmitter being connected to one arm of said bellcrank for pivoting said bellcrank upon steering movement of said front fork, a steering arm affixed to the rear wheel and supporting the rear wheel for rotation about a rotational axis and for steering movement about a steering axis, and means for pivotally connecting the other arm of the bellcrank to said rear wheel steering arm.

6. A motorcycle as set forth in claim 5 further including a universal joint for driving the rear wheel and having its axis aligned with the steering axis.

7. A motorcycle as set forth in claim 6 wherein the rear wheel is supported by means of a trailing arm having a first hub carrier affixed to the trailing arm and rotatably journaling a first shaft, a second hub carrier pivotally connected to said first hub carrier about the steering axis of the rear wheel, a second shaft journaled by said second hub carrier and rotatably coupled to the rear wheel and universal joint means interconnecting said first and second shafts for rotation, the universal joint means having its pivot axis lying in said rear wheel steering axis.

8. A motorcycle as set forth in claim 7 further including a drive shaft for driving said first shaft and journaled within the trailing arm.

9. A motorcycle as set forth in claim 8 further including a joint for driving the drive shaft and permitting pivotal movement of the trailing arm about its pivot axis.

* * * * *